Inventors:
Adolf Schank
Otto Bittel

Patented Aug. 26, 1930

1,773,869

UNITED STATES PATENT OFFICE

ADOLF SCHANK AND OTTO BITTEL, OF OTTWEILER, GERMANY

AUTOMATIC STOP GEAR FOR LIFT CAGES

Application filed September 12, 1928, Serial No. 305,557, and in Germany January 13, 1928.

This invention relates to an automatic stop gear for lift cages and the like and consists in the provision on the cage of a horizontal, vertically movable frame carrying brake elements adapted to be positively applied on an upward displacement of the frame relative to the cage, and spring-pressed pilot brakes adapted to effect such displacement of the frame in case the cable should break, said pilot brakes being normally held in an inoperative position by elements which are released on the breakage of the cable.

Figure 1:
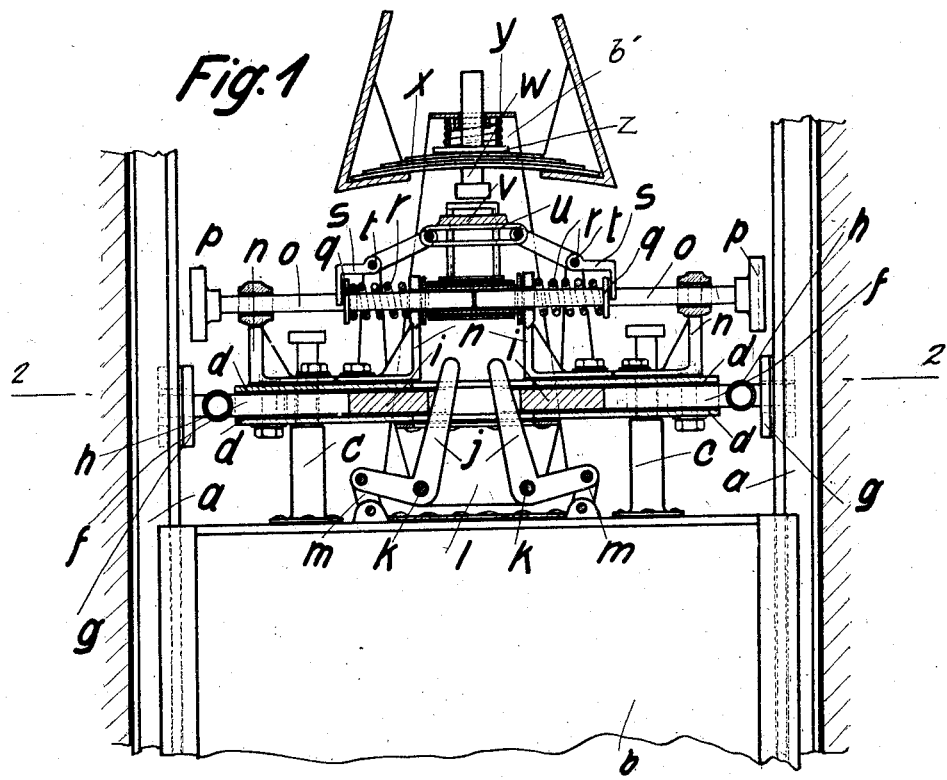
Figure 2:
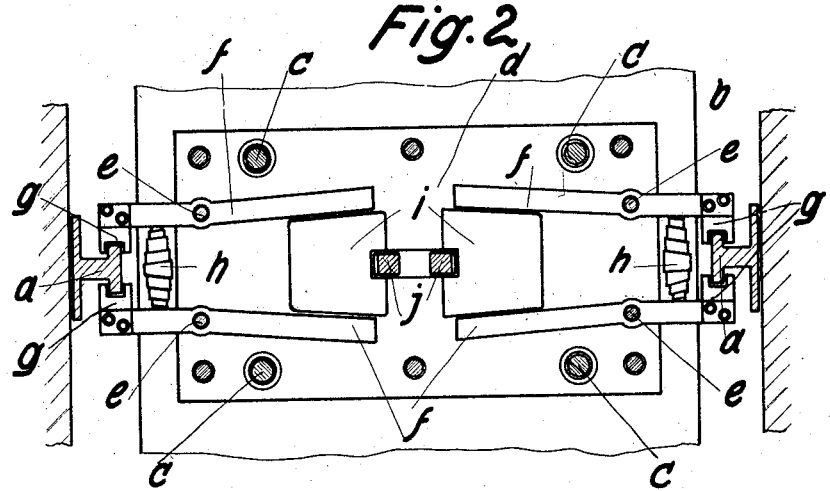

Fig. 1 of the accompanying drawings represents a vertical section of the device, and Fig. 2, a horizontal section of the same taken on the line 2—2 of Fig. 1.

The lift cage $b$ is guided in known manner on vertical rails $a$ and is provided with uprights $c$ formed with necks whereon a horizontal frame $d$ is adapted to slide. Two pairs of brake levers $f$ are mounted within the frame on vertical pivots $e$ and fitted with exchangeable brake shoes $g$ adapted to grip the guide rails $a$. Springs $h$ arranged between the lever arms tends to hold the brake shoes out of engagement with the rails. Between the free ends of each lever pair, a wedge $i$ is so arranged that it can be displaced for spreading the arms apart and applying the brake shoes to the guide rails. The wedges are for this purpose engaged by bell-cranks $j$ which are pivoted at $k$ to brackets $l$ secured to the underside of the frame $d$ and which are connected by links $m$ to the cage $b$ so as to be turned for application of the brakes when the frame $d$ is upwardly displaced relative to the cage.

In brackets $n$ on top of the frame $d$ two horizontal, coaxial rods $o$ are arranged to slide. At the outer ends of the rods brake shoes $p$ are provided which can be applied to the guide rails $a$ by an outward displacement of the rods. Coil springs $r$, arranged on the rods $o$, bear against the rear brackets $n$ and against collars $q$ on the rods and tend to apply the brakes $p$ to the guide rails. A pair of triggers $s$, which are pivoted at $t$ to brackets on the frame $d$, normally engage the collars $q$ so as to prevent the brakes $p$ from being applied. The triggers engage in guideways $u$ in a horizontal, vertically slidable plate $v$ by the displacement of which the triggers can be operated for releasing the brakes $p$.

The cage is suspended on the cable by means of a frame $b'$ which embraces the mechanism just described. The frame bears by means of a coil spring $y$ against a leaf spring $x$. A plunger $w$, which is guided in the frame and which passes through the springs, has a collar $z$ which is clamped between the two spring elements and which normally maintains the head of the plunger at a small distance from the plate $v$. If the spring $x$ should be released owing to breakage of the cable, the plunger will be thrust forward by the spring $y$ so as to strike against and depress the plate $v$ which then operates the triggers and releases the brakes $p$. The latter act as pilot brakes in that they cause the frame $d$ to be raised on the uprights $c$ as the cage descends, and by this raising of the frame the bell-cranks $j$ will be turned so as to apply the principal brakes $g$ and stop the cage.

We claim:

1. In an automatic stop gear for lift cages and the like, the combination with guide rails for the cage, of a frame supported on the cage and adapted for vertical displacement relative thereto, principal brakes comprising two pairs of double-arm levers mounted in said frame and adapted for application to said guide rails, wedges arranged to slide in the frame and adapted to be interposed between the lever arms for applying the brakes, bell cranks pivoted to the cage and to the frame and adapted to co-operate with said wedges for applying the brakes on displacement taking place between the cage and the frame, pilot brakes mounted in the frame and adapted to be applied to the guide rails for displacing the frame, springs tending to apply said pilot brakes, means for arresting the pilot brakes in in-operative position, and means connected with the suspension elements of the cage for releasing the pilot brakes on breakage of the lift cable.

2. A structure as claimed in claim 1 wherein the means for arresting the pilot brakes comprise a pair of triggers and wherein the releasing means comprises a spring-pressed plunger adapted to strike against the triggers, and means connected with the suspension elements of the cage for maintaining said plunger normally tensioned and in inoperative position.

ADOLF SCHANK.
OTTO BITTEL.